United States Patent
Träger et al.

(10) Patent No.: US 10,862,421 B2
(45) Date of Patent: Dec. 8, 2020

(54) COVER ELEMENT FOR A JUNCTION BOX OF A SOLAR MODULE

(71) Applicant: Hanwha Q Cells GmbH, Bitterfeld-Wolfen OT Thalheim (DE)

(72) Inventors: Markus Träger, Bitterfeld-Wolfen OT Thalheim (DE); Robert Olyschläger, Bitterfeld-Wolfen OT Thalheim (DE); Henning Busse, Bitterfeld-Wolfen OT Thalheim (DE); Andreas Pfennig, Bitterfeld-Wolfen OT Thalheim (DE)

(73) Assignee: Hanwha Q Cells GmbH, Bitterfeld-Wolfen Ot Thalheim (DE)

( * ) Notice: Subject to any disclaimer, the term of this patent is extended or adjusted under 35 U.S.C. 154(b) by 0 days.

(21) Appl. No.: 16/080,761

(22) PCT Filed: Feb. 17, 2017

(86) PCT No.: PCT/DE2017/100137
§ 371 (c)(1),
(2) Date: Feb. 5, 2019

(87) PCT Pub. No.: WO2017/148470
PCT Pub. Date: Sep. 8, 2017

(65) Prior Publication Data
US 2019/0158018 A1 May 23, 2019

(30) Foreign Application Priority Data
Feb. 29, 2016 (DE) .................. 10 2016 103 600

(51) Int. Cl.
H02S 40/34 (2014.01)
H02G 3/08 (2006.01)
H02G 3/14 (2006.01)

(52) U.S. Cl.
CPC ............. *H02S 40/34* (2014.12); *H02G 3/081* (2013.01); *H02G 3/14* (2013.01)

(58) Field of Classification Search
CPC ....... H02S 40/34; H02G 3/081; H05K 5/0252
See application file for complete search history.

(56) References Cited

U.S. PATENT DOCUMENTS 7,365,965 B2    4/2008   Higashikozono et al.
7,444,743 B2 *  11/2008  Feldmeier ......... B32B 17/10036
                                                        29/748

(Continued)

FOREIGN PATENT DOCUMENTS

DE       102010047247 A1    4/2011

*Primary Examiner* — Hung V Ngo
(74) *Attorney, Agent, or Firm* — Taft Stettinius & Hollister LLP

(57) ABSTRACT

The invention relates to a cover element, in particular a lid, for a junction box of a solar module, wherein the cover element forms upper and undersides that are mirror-symmetrical in terms of its geometrical form, and wherein at least one first marking is applied to the upper side and/or at least one first marking is formed via the upper side in the form of an indentation and/or elevation, and at least one second marking is applied to the underside and/or at least one second marking is formed via the underside in the form of an indentation and/or elevation, wherein the at least one first marking is not identical to the at least one second marking and/or the cover element comprises a rotational joint or a part of a rotational joint and/or is/can be operatively connected to a rotational joint, such that the lid is/can be mounted so that it can be horizontally rotated about the rotational axis of the rotational joint. The invention also relates to an assembly of the cover element and junction box, and to a use thereof.

10 Claims, 2 Drawing Sheets

(56) References Cited

U.S. PATENT DOCUMENTS

| | | | | | |
|---|---|---|---|---|---|
| 7,824,190 | B2* | 11/2010 | Beck | ................. | H01L 31/02013 |
| | | | | | 136/243 |
| 7,972,177 | B2* | 7/2011 | Richter | ................... | H02S 40/34 |
| | | | | | 136/244 |
| 8,410,352 | B2* | 4/2013 | Belouet | ............... | H01L 31/1804 |
| | | | | | 136/256 |
| 9,028,262 | B2* | 5/2015 | Deng | .................... | H01R 43/18 |
| | | | | | 439/76.1 |
| 2010/0331042 | A1* | 12/2010 | Yang | .................. | H01M 2/1066 |
| | | | | | 455/556.1 |
| 2011/0108085 | A1* | 5/2011 | Quiter | ............... | H01L 31/02013 |
| | | | | | 136/244 |
| 2012/0052719 | A1* | 3/2012 | Xue | ........................ | H02G 3/16 |
| | | | | | 439/485 |
| 2013/0248243 | A1* | 9/2013 | Dinh | ....................... | H02G 1/00 |
| | | | | | 174/535 |
| 2014/0053892 | A1* | 2/2014 | Seol | ....................... | H02S 50/00 |
| | | | | | 136/251 |
| 2015/0237752 | A1* | 8/2015 | Craig | .................. | H05K 5/0247 |
| | | | | | 174/535 |
| 2018/0269669 | A1* | 9/2018 | Kato | ...................... | H02G 3/081 |

\* cited by examiner

COVER ELEMENT FOR A JUNCTION BOX OF A SOLAR MODULE

CROSS-REFERENCE TO RELATED APPLICATIONS

The present application is a national phase entry of international application no. PCT/DE2017/100137 filed on Feb. 17, 2017.

BACKGROUND OF THE INVENTION

Field of the Invention

The present invention relates to a cover element for a junction box of a solar module.

Description of Related Art

According to the prior art, it is known for solar modules to be constructed such that a multiplicity of possibly mechanically sensitive solar cells are electrically connected to one another and enclosed in a layer system. By means of the layer system, which generally comprises a transparent substrate, in particular a glass substrate, and a rear side cover (backsheet), between which the solar cells are arranged, the solar cells are protected against mechanical loads and weather influences. Here, the electrical connectors between the solar cells are also enclosed by the layer system.

Foils composed of EVA (ethylene-vinyl acetate) or of some other suitable material are usually introduced between said layers, such that the layer system can be laminated together under the influence of heat and pressure.

Here, a solar module comprises electrical connectors by means of which the solar cells enclosed by the layers can be contacted from the outside. Solar modules in the case of which multiple solar cells are interconnected generally comprise bypass diodes.

In the case of such solar modules, it may be the case that individual solar cells do not output any current. This may be caused for example by shading or contamination with dirt. Such varying power output of the individual solar cells can give rise to overheating or defects in the solar module, because the shaded or dirty solar cell suddenly acts as a resistor. Furthermore, the current output of the solar module is dependent on its weakest element, such that the efficiency of the solar module is adversely affected. By means of the bypass diodes, those solar cells which output insufficient levels of power are bypassed. A diode permits the flow of current on the in one direction. The bypass diode is in this case connected in antiparallel with respect to the cells and is, in the normal operating state, polarized in the blocking direction. If it is now the case that one) or more) solar cell(s) outputs no current, then this can flow through the bypass diode and thus prevents damage and deficits. The blocking voltage of a bypass diode corresponds at least to the off-load voltage of the string connected in parallel.

If, in the event of shading or contamination with dirt, bypass diodes are flowed through with current in the forward direction, the diode semiconductor chips heat up owing to internal ohmic resistances, and release these energy losses in the form of heat. These diodes must therefore be kept as cool as possible, wherein the passive dissipation of heat plays a crucial roll.

According to the prior art, most diodes are positioned in metal busbars integrated into junction boxes, such that the large surface of the busbars can provide a sufficient dissipation of heat. This form of junction boxes may be provided in potted or non-potted form.

Here, solar modules according to the prior art require a frame and a thick glass substrate layer (approximately 3.2 mm) in order for the forces acting from the surface (snow, wind) to be dissipated firstly into the frame and then, at the clamping points, into the supporting structure. Presently conventional frame heights are 30 mm to 40 mm.

For this purpose, frame elements are pushed onto the module laminate at all four sides, and are non-detachably connected to the module laminate using tape or silicone. Adjacent frame parts are connected to one another in non-positively locking fashion at the frame corners, for example by virtue of an angle piece being pressed in. Here, the frame profile engages around the module laminate, such that a step with a height of approximately 1 mm is formed in relation to the glass surface.

The assembly of the frame involves great outlay in terms of work, personnel and time, and is carried out in non-automated or only partially automated fashion, which greatly increases the outlay in terms of manufacturing.

Here, the installation of a junction box partially below or in the region of the frame is particularly cumbersome. Junction boxes must, after the assembly process and after the electrical contacting performed therein, be securely closed using a cover, which also cannot be reopened without using tools.

Here, in the case of decentralized junction box systems, at least three junction boxes are used—a right-hand-side, a left-hand-side and a central junction box.

This has the effect that three different covers are required in order to denote the plus and minus of the two outer junction boxes, and one more for the central junction box.

BRIEF SUMMARY OF THE INVENTION

Accordingly, it is the object of the present invention to overcome the disadvantages of the prior art and in particular provide a cover and a junction box which are easily connectable to one another in restricted space conditions and which can be used universally for right-hand-side and left-hand-side junction boxes.

DETAILED DESCRIPTION OF THE INVENTION

Said object is achieved by means of a cover element, in particular lid, for a junction box of a solar module, wherein the cover element, in terms of its geometrical shape, forms top and bottom sides of mirror-symmetrical form, and wherein at least one first marking is applied to the top side and/or at least one first marking in the form of depression and/or elevation is formed by the top side, and at least one second marking is applied to the bottom side and/or at least one second marking in the form of a depression and/or elevation is formed by the bottom side, wherein the at least one first marking is not identical to the at least one second marking, and/or the cover element comprises a rotary joint or a part of a rotary joint and/or can be placed in operative connection with or is operatively connected to a rotary joint, such that the cover can be or is mounted so as to be horizontally rotatable about the axis of rotation of the rotary joint.

A mirror-symmetrical design according to the invention of front side and rear side of a cover element is associated with numerous advantages. For the decentralized arrangement of junction boxes on a solar module, use is made of right-hand-side and left-hand-side junction boxes which are used for the electrical contacting of different polarities. By means of a cover element according to the invention or a lid according to the invention, it is made possible to use a single lid type for the right-hand-side and the left-hand-side junction box. Owing to different polarity, it has proven to be particularly advantageous here if the two symmetrical top and bottom sides of the cover element according to the invention have different markings.

For example, in one embodiment of the present invention, it may be preferable for a first marking to comprise a "plus" for a positive polarity and for the opposite, second marking to comprise a "minus" for a negative polarity. This ensures that the cover elements according to the invention are not only variably usable but also that operating errors during the contacting by a user can be prevented. A means of protecting against incorrect connection can thus be provided, which offers numerous advantages in practice.

It has furthermore proven to be advantageous that, according to one embodiment, the lid according to the invention can be mounted, and connected to a junction box, so as to be rotatable in a horizontal plane.

Here, the expression "horizontal" is to be understood relative to the vertically arranged side walls of a junction box, and serves for easier understanding of the invention. A horizontal rotation of the cover element according to the invention is not intended here to mean that said cover element is in fact rotatable only in an absolutely horizontal direction, merely that said cover element can be rotated substantially horizontally in relation to a substantially vertical side wall. Here, it is obvious to a person skilled in the art that slightly inclined rotational movements of the lid relative to the side walls are also encompassed by the invention.

By means of such a rotation in a horizontal plane, it is made possible that, even in the case of spatially restricted installation situations, for example in the case of a distributor box which is at least partially covered by a frame of a solar module, said distributor box can be reliably closed using simple means. By contrast to the prior art, the cover element no longer needs to be mounted onto the junction box from above and/or connected to said junction box from above.

According to the invention, in one embodiment, it may be advantageous if the cover element is designed and configured to be placed in operative connection with or be operatively connected to a detent means for mechanical locking between cover element and a junction box, and/or to comprise a detent means for such a connection.

A detent means of said type offers the advantage that the cover element according to the invention is not or cannot be inadvertently moved from its closure position into an opened position. In particular, it is prescribed in various safety standards that a cover element according to the invention cannot be transferred from the closed position into the open position without the use of tools. This can be ensured by the detent means according to the invention.

In one embodiment of the invention, provision may be made whereby the cover element has a geometry comprising two partially overlapping rectangles which are arranged at an angle a, in particular an angle a in a range greater than or equal to 30° or less than or equal to 70°, in particular of 45°, with respect to one another, wherein the rectangles are in particular of different lengths, such that the cover element forms a relatively short partial region and a relatively long partial region.

A length according to the invention refers to the spacing between the front and rear end of a cover element, and a width refers to the spacing between two opposite side edges. By means of the design which is preferred according to the invention, the cover element forms an obliquely extending L, which, with regard to complementary junction boxes, has proven to be advantageous in particular with respect to a required tension-relieving means and the desired cable guidance.

Provision may furthermore be made whereby a projection is formed on one of the longitudinal side edges, in particular in the corner region of lateral and front or rear side edge, wherein the axis of rotation of the rotary joint and/or the rotary joint or a part of the rotary joint is arranged in the region of the projection.

A projection of said type has the advantage in particular that the side edges themselves do not impede a rotation of the cover device according to the invention. By means of the projection according to the invention, it is thus possible for the axis of rotation to be relocated further outward.

Here, provision may be made in particular whereby the projection is of circular-segment-shaped, round and/or oval form, in particular is semicircular.

Also, in one embodiment of the present invention, it may be preferable if an arm is formed on a longitudinal side edge, in particular on a longitudinal side edge which forms the one projection, in particular in the region of the same side end of the longitudinal side edge on which the projection is formed, wherein, in particular, the arm is designed and configured to be inserted into an aperture of a junction box.

Such a projection which can be inserted into an aperture of the junction box leads to further locking of the cover element according to the invention irrespective of the physical design of the side walls of a junction box. Furthermore, a connection between cover element and junction box can be created in this way, because, in a preferred embodiment, the detent elements are not arranged on this side end, so as not to impede a rotational opening and closing of the cover element.

It may furthermore be preferable if, on a longitudinal side edge, in particular on a longitudinal side edge situated opposite the longitudinal side edge which forms the one projection and/or the arm, on the top side and on the bottom side, there are formed two cantilevers which are situated symmetrically oppositely on the top side and on the bottom side of the cover element and which have a triangular cross section, which cantilevers are formed so as to rise obliquely from the longitudinal side edge to the center of the cover element, and which cantilevers, in particular, can be placed in operative connection with or are operatively connected to a detent element of a junction box.

This may be advantageous for secure locking, and/or the release of locking, of the cover element to a distributor box.

The invention also provides an arrangement of a cover element according to the invention and of a junction box for a solar module, wherein the cover element is connected to the junction box by means of a rotary joint which is provided by the junction box or which is formed by the junction box together with the cover element, wherein the axis of rotation formed by the rotary joint is formed vertically with respect to a side wall of the junction box, such that the cover element is mounted so as to be rotatable horizontally with respect to the side wall of the junction box.

Finally, the arrangement may preferably be configured such that the junction box has detent means which, in the closed state of the cover element, are operatively connected to the latter and prevent an opening of the junction box, wherein the detent means are formed preferably by two mutually spaced-apart rows of alternating apertures and projections, such that always one aperture of a first row is arranged so as to be situated opposite one projection of the second row and vice versa, and the cover element is arranged between the first row and the second row in the closed state, and wherein, in particular, one of the projections can be placed in operative connection with or is operatively connected to one of the cantilevers of the cover element.

The spacing of the first and second rows is defined by the thickness of the cover element.

Finally, the invention also provides the use of a cover element according to the invention and/or of an arrangement according to the invention in a solar module for the purposes of closing off a junction box of a solar module and/or for electrical contacting of a solar module.

Further features and advantages of the invention will emerge from the following description, in which exemplary embodiments of the invention are discussed in more detail by way of example on the basis of schematic drawings, without the invention being restricted by these.

FEATURE LIST 1 cover element
3 junction box
5 detent hook
7 first marking
9 second marking
11 rotary joint
13 projection
15 first longitudinal side edge
17 arm
19 second longitudinal side edge
21 cantiveler

BRIEF DESCRIPTION OF THE SEVERAL VIEWS OF THE DRAWINGS

In the drawing:

FIG. 1 shows a cover element 1 according to the invention. FIG. 2 shows a junction box 3 according to the invention with detent hook 5. FIG. 3 shows the cover element 1 connected to the junction box 3 according to the invention. The features of the invention disclosed in the above description, in the claims and in the drawings may be essential both individually and in any desired combination for the realization of the invention in its various embodiments.

Figure 1:
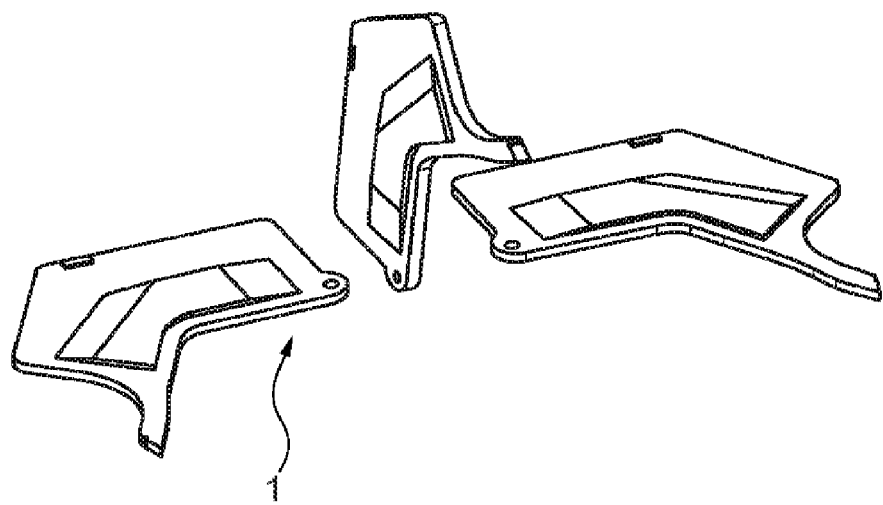
FIG. 1 shows a schematic perspective view of a first embodiment of cover elements according to the invention.
Figure 2:
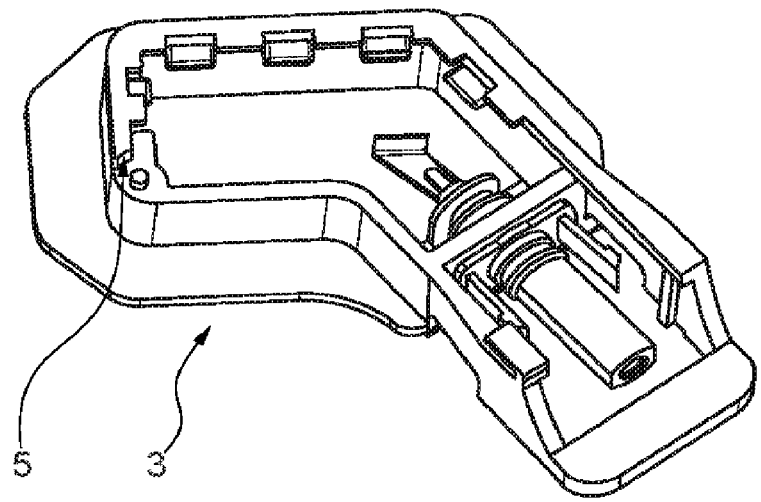
FIG. 2 shows a schematic perspective view of a first embodiment of junction boxes according to the invention.
Figure 3:
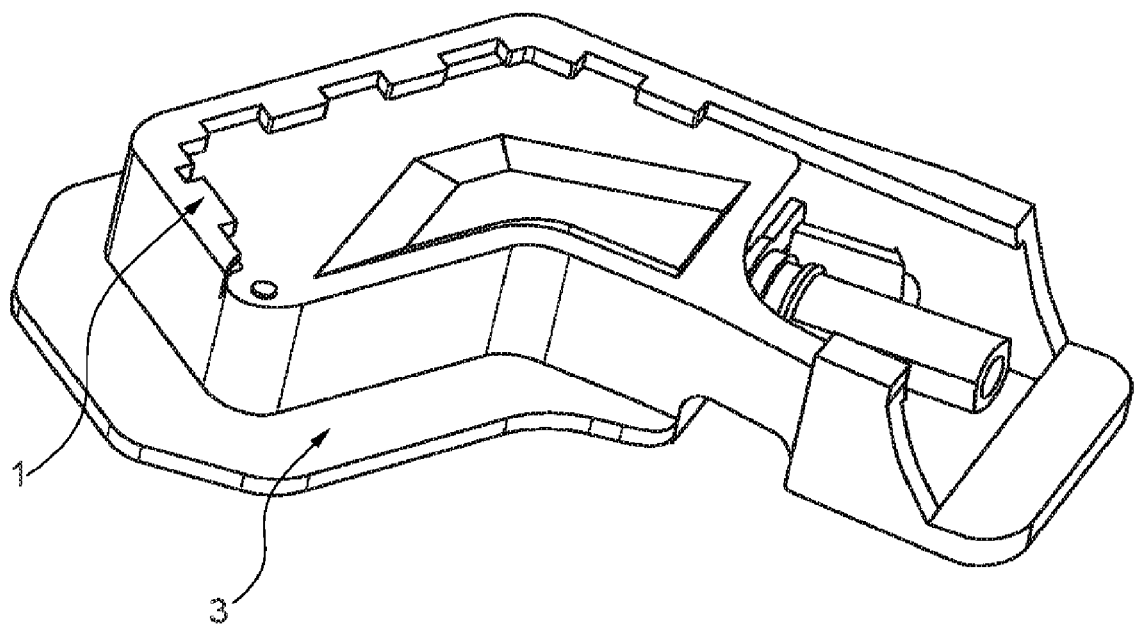
FIG. 3 shows a schematic perspective view of a first embodiment of a cover element according to the invention on a junction box according to the invention.

The invention claimed is:

1. A cover element (1) for a junction box of a solar module, comprising:
    a cover element (1), wherein the cover element (1), in terms of its geometrical shape, forms top and bottom sides of mirror-symmetrical form, and
    wherein at least one first marking (7) in the form of at least one of a depression and an elevation is formed by the top side, and
    at least one second marking (9) in the form of at least one of a depression and an elevation is formed by the bottom side,
    wherein the at least one first marking (7) is not identical to the at least one second marking (9), and the cover element (1) comprises at least part of a rotary joint (11), such that the cover (11) is mounted so as to be horizontally rotatable about the axis of rotation of the rotary joint (11).

2. The cover element as claimed in claim 1, further wherein the cover element (11) is designed and configured to be operatively connected to a detent means (5) for mechanical locking between cover element (1) and a junction box (3) or to comprise a detent means (5) for such a connection.

3. The cover element of claim 1, further wherein the cover element (1) has a geometry comprising two partially overlapping rectangles which are arranged at an angle α, in particular an angle α in a range greater than or equal to 30° or less than or equal to 70°, in particular of 45°, with respect to one another, wherein the rectangles are of different lengths, such that the cover element forms a relatively short partial region and a relatively long partial region.

4. The cover element of claim 1, further comprising a projection (13) formed on one of the longitudinal side edges (15) in the corner region of lateral and front or rear side edge (15), wherein the axis of rotation of at least part of the rotary joint (11) is at least partially arranged in the region of the projection.

5. The cover element as claimed in claim 4, further wherein the projection (13) is of circular-segment-shaped, round or oval form.

6. The cover element of claim 1, further comprising an arm (17) formed on a longitudinal side edge (15) which forms the one projection (13) in the region of the same side end of the longitudinal side edge on which the projection (13) is formed, wherein, the arm (17) is designed and configured to be inserted into an aperture of a junction box (3).

7. The cover element of claim 1, further comprising a longitudinal side edge (19) situated opposite the longitudinal side edge (15) which forms at least one of the one projection (13) and the arm (17), on the top side and on the bottom side, there are formed two cantilevers (21) which are situated symmetrically oppositely on the top side and on the bottom side of the cover element (1) and which have a triangular cross section, which cantilevers (21) are formed so as to rise obliquely from the longitudinal side edge (19) to the center of the cover element (1), and which cantilevers (21) are operatively connected to a detent element (5) of a junction box (3).

8. The cover element of claim 1, further wherein the cover element (1) is connected to a junction box (3) for a solar module by means of a rotary joint (11) which is provided by the junction box (3) or which is formed by the junction box (3) together with the cover element (1), wherein the axis of rotation formed by the rotary joint (11) is formed vertically with respect to a side wall of the junction box (3), such that the cover element (1) is mounted so as to be rotatable horizontally with respect to the side wall of the junction box (3).

9. The cover element of claim 8, further wherein the junction box (3) has detent means (5) which, in the closed state of the cover element (1), are operatively connected to the latter and prevent an opening of the junction box (3), wherein the detent means (5) are formed preferably by two mutually spaced-apart rows of alternating apertures and projections, such that always one aperture of a first row is arranged so as to be situated opposite one projection of the second row and vice versa, and the cover element (1) is arranged between the first row and the second row in the closed state, and wherein, one of the projections is operatively connected to one of the cantilevers (21) of the cover element (1).

10. The cover element of claim 1, further wherein of the cover element closes off a junction box of a solar module for electrical contacting of the solar module.

* * * * *